United States Patent [19]
Depew

[11] Patent Number: 5,845,782
[45] Date of Patent: Dec. 8, 1998

[54] SEPARATOR FOR REMOVING FINE PARTICULATES FROM AN AIR STREAM

[75] Inventor: Llewellyn E. Depew, St. George, Canada

[73] Assignee: Hurricane Pneumatic Conveying, Inc., Brantford, Canada

[21] Appl. No.: 629,287

[22] Filed: Apr. 8, 1996

[51] Int. Cl.⁶ .............................. B07B 9/00; B01D 46/04
[52] U.S. Cl. ........................... 209/23; 209/148; 209/380; 55/302; 55/337
[58] Field of Search ................................ 209/21–33, 132, 209/144, 146, 147, 148, 379, 380; 55/301, 302, 337; 406/168, 173

[56] References Cited

U.S. PATENT DOCUMENTS

| | | | |
|---|---|---|---|
| 1,897,195 | 2/1933 | Howden . | |
| 2,035,410 | 5/1936 | Smith | 302/59 |
| 2,134,978 | 1/1938 | Marshall . | |
| 2,252,581 | 5/1941 | Saint-Jacques | 209/144 |
| 2,580,581 | 1/1952 | Niemitz | 302/28 |
| 2,744,792 | 5/1956 | Finn | 302/14 |
| 2,890,081 | 6/1959 | Terrett | 302/59 |
| 3,030,153 | 6/1962 | Krenke et al. | 302/17 |
| 3,273,943 | 9/1966 | Russell | 302/59 |
| 3,561,824 | 2/1971 | Homan | 302/59 |
| 3,925,044 | 12/1975 | Tu et al. | 55/337 |
| 3,994,532 | 11/1976 | Hahn | 302/58 |
| 4,200,415 | 4/1980 | Boring | 406/173 |
| 4,415,297 | 11/1983 | Boring | 406/168 |
| 4,473,326 | 9/1984 | Oetiker | 406/14 |
| 4,650,504 | 3/1987 | Howeth | 55/302 |
| 4,680,038 | 7/1987 | Titus | 55/302 |
| 4,740,221 | 4/1988 | Howeth | 55/302 |
| 4,756,727 | 7/1988 | Howeth | 55/302 |
| 4,802,983 | 2/1989 | Howeth | 55/302 |
| 4,810,270 | 3/1989 | Terry et al. | 55/337 X |
| 4,834,586 | 5/1989 | Depew | 406/18 |
| 5,006,018 | 4/1991 | Depew | 406/18 |
| 5,104,429 | 4/1992 | Miller | 55/337 X |
| 5,478,484 | 12/1995 | Michaluk | 55/337 X |

FOREIGN PATENT DOCUMENTS

| | | | |
|---|---|---|---|
| 2 599 272 | 12/1987 | France . | |
| 34 22 592 A1 | 4/1986 | Germany . | |
| 86 12 624.5 | 9/1986 | Germany . | |
| 93 02 704.4 | 5/1993 | Germany . | |
| 1816484 | 5/1993 | U.S.S.R. | 55/302 |
| 859333 | 1/1961 | United Kingdom . | |
| 9408696 | 4/1994 | WIPO | 55/302 |

OTHER PUBLICATIONS

Copy of International Search Report dated Jul. 8, 1997.

Primary Examiner—Tuan N. Nguyen
Attorney, Agent, or Firm—Ratner & Prestia

[57] ABSTRACT

The invention provides a separator for removing small particulates from an air stream, the separator includes pneumatic separator with a relatively small filter element built inside the separator to remove particulates from the air stream down to as small as one micron. The pneumatic separator relies on a vortex effect and sudden changes in direction of the air flow to strip out most of the particulates, and because the very small particulates have insufficient mass to be dislodged from the air in this way, these particulates remain in the air stream and are carried to the filter element where they build up on the element. The build up is interrupted by the incoming air which flows aggressively around the element and strips parts of the build-up off the element. This ongoing random process can be supplemented if necessary by back flushing. Both the separated particulates and those stripped off the filter element accumulate in the separator for subsequent removal.

3 Claims, 2 Drawing Sheets

SEPARATOR FOR REMOVING FINE PARTICULATES FROM AN AIR STREAM

FIELD OF THE INVENTION

This invention relates to material separators of the type used to remove powders and fine particulates from air in pneumatic material conveying systems.

BACKGROUND OF THE INVENTION

This invention will be described primarily with reference to apparatus used to separate powders from an air stream. However it will be clear from the following description that the invention is applicable to separating fine particulates generally from a carrier air stream. These particulates can include dust, granular material, etc. The invention is particularly useful in separating very fine particulate as small as one micron.

Powders are often moved by use of an air stream which entrains and carries the powders to a new location where the powder must be stripped before exhausting the air. Clearly, the air must be filtered aggressively in order to ensure that no fine particulates are exhausted into the air where they could become a health hazard. This is of course particularly true when the material being conveyed has toxic characteristics.

These problems have lead to a variety of structures intended to trap the powder. In general the structures have one major drawback and that is that the powders have a tendency to clog the filters extremely quickly. As a result, it is not uncommon for exhaust air to be passed into one of several filters having very large surface areas and which can be used sequentially to allow individual filters to be cleaned either by removal or by "back-flushing" using a reversed air stream.

Standards for air cleanliness in work places continue to become more strict with increasing penalties for non-compliance. There is therefore a growing need to solve the problem of providing efficient separators capable of removing very fine particulates from air. Such separators must be reliable and require minimum maintenance.

Conventional separators have a series of stages with the last stage being an in-line filter having a small pore size. This last filter dictates the degree of separation achieved.

SUMMARY OF THE INVENTION

It has been found that a combination of a pneumatic separator with a relatively small filter element built inside the separator can remove particulates from an air stream down to as small as one micron with minimum maintenance. The pneumatic separator relies on a vortex effect and sudden changes in direction of the air flow to strip out most of the particulates. However, the very small particulates have insufficient mass to be dislodged from the air in this way so these particulates remain in the air stream and are carried to the filter element where they build up on the element. The build-up is interrupted by the incoming air which flows aggressively around the element and strips parts of the build-up off the element. This ongoing random process can be supplemented if necessary by back flushing. Both the separated particulates and those stripped off the filter element accumulate in the separator for subsequent removal. It has been found that such an arrangement can run essentially continuously without being effected by a build up of material which would block the filter element. Inspection of the element indicates that a fine layer of particulates is present on the surface but is not allowed to build up sufficiently to block the effect of the element. As a result a relatively small filter element can be used to bring the air to a high level of purity relatively free of particulates.

BRIEF DESCRIPTION OF THE DRAWINGS

The invention will be better understood with reference to the drawings, in which.

DESCRIPTION OF THE PREFERRED EMBODIMENT(S)

Figure 1:
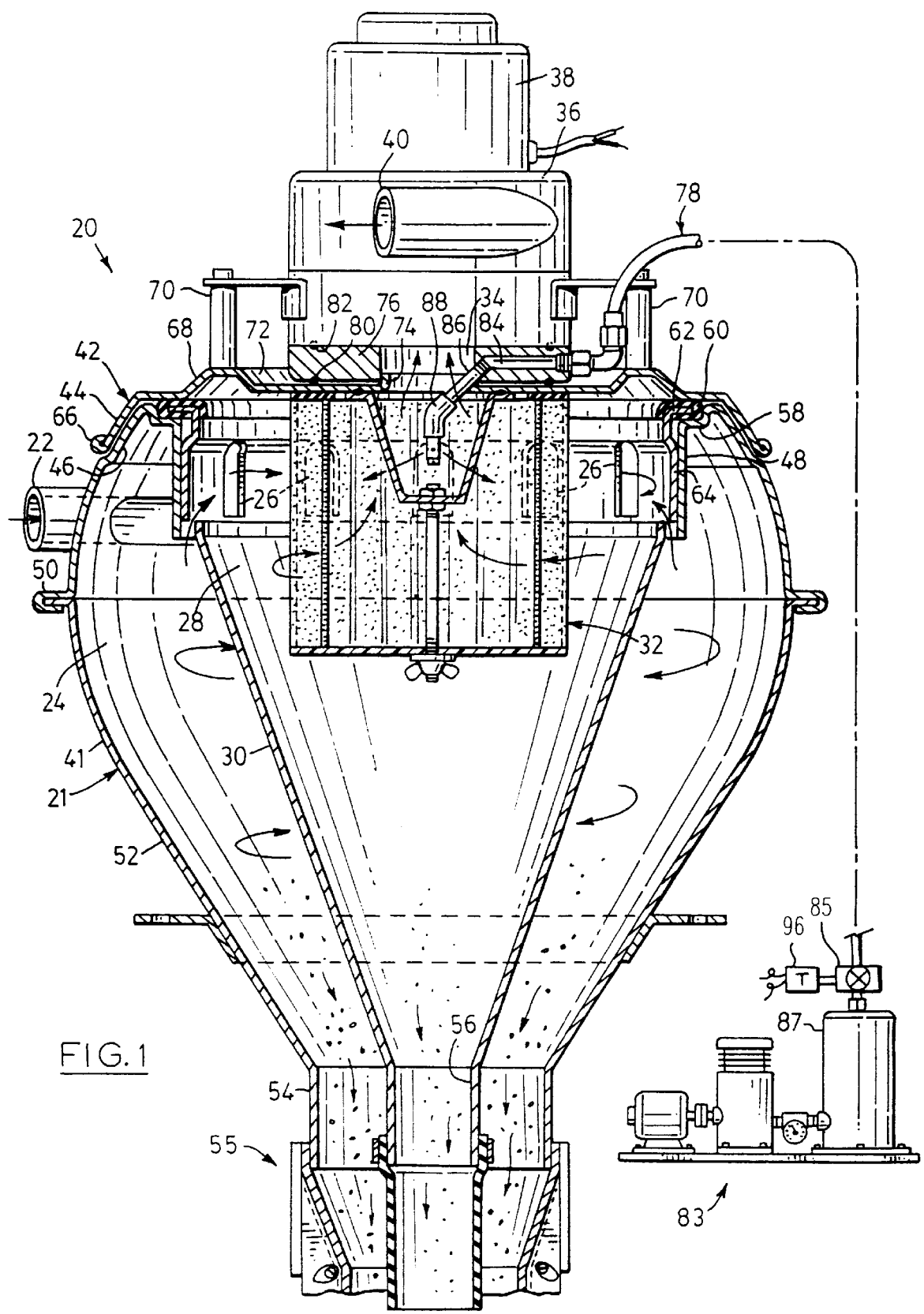
FIG. 1 is a side view with the main portions in section, and illustrating a separator according to a preferred embodiment of the invention and incorporating a filter element, the separator being shown diagrammatically in association with equipment used to provide blowback in the filter element.

Reference is first made to FIG. 1 which illustrates a preferred embodiment of separator according to the invention and indicated generally by the numeral 20. The separator has a housing 21 extending vertically about a central axis and a tangential inlet 22 feeding air into an annular space 24. Air entering the annula space will flow circumferentially around the annular space in the form of a vortex so that particulates will be flowing against the outer wall before falling vertically. The air will initially flow around and downwardly before turning to flow upwardly while maintaining the same vortex flow. Only small particulates with very small mass can stay in the air as it moves towards and then through louvres 26 to enter an inner annular space 28. In this space the air will again move in vortex fashion to separate particulates in a frustro-conical hopper 30. The air will move aggressively and eventually find its way out by passing through an annular filter element 32 before moving vertically upwards through an outlet 34 in the form of a central duct drawn by a fan 36 which is driven by a motor 38. Once the air passes through the fan it will exit tangentially through an exit 40.

It will be evident that the air flow through the separator causes air to move essentially in the form of a vortex and that this annular motion is maintained in both the outer annular space 24 and the inner annular space 28. The result is that most particulates will be cast out of the air flow to fall downwardly to the bottom of the separator. However, because the very fine particulates have very small mass, they will be carried with the air and find their way onto the filter element 32 where they would be expected to clog the element very quickly. The aggressive flow of air around the filter element as the air enters through the louvres 26 tends to strip any build-up of the element. Consequently, there is an unexpected cleaning action around the filter element not found in inline systems.

The separator 20 includes the housing 21 having an outer shell 41 disposed symmetrically about a vertical axis and including a lid 42 having an outer rim 44 fitted on an upper portion 46 shaped to receive the lid and extending inwardly to terminate in a vertical cylindrical wall 48. The upper portion 46 has a peripheral connection 50 to a lower part 52 generally in the form of a frustro-conical shape reducing downwardly and having a rounded outer appearance. This part terminates in a cylindrical wall 54 which is attached to a batch release closure indicated generally by the numeral 55. This closure permits material collected in the outer and inner annular spaces 24, 28 to be removed periodically as is common in the art.

The outer shell 41 combines with the frustro-conical hopper 30 disposed about the aforesaid vertical axis to define the annular space 24. The hopper extends between the cylindrical wall 40 of the upper portion 46 and converges downwardly terminating at a cylindrical wall 56 concentric with the cylindrical wall 54. The wall 56 is also attached to the batch release closure 55.

The upper portion 46 of the outer shell 41 defines an upwardly facing annular recess 58 adapted to receive a seal 60 engaged about an out-turned flange 62 on a generally cylindrical insert 64 positioned about the vertical axis within the cylindrical wall 48 on the upper portion 46. This insert defines the louvres 26 which are shaped to accommodate air flow upwardly between an upper extremity of the frustro-conical hopper 30 and the lower extremity of the cylindrical wall 48 of the upper portion 46. The arrangement is such that a variety of inserts can be used to provide different numbers of louvres as required and the insert is held in place by the lid 42 clamping the seal 60 against the annular recess 58. Suitable conventional over-centre snap fasteners (not shown) are used to pull the lid into place using a rolled lip 66 provided for the purpose on the bottom extremity of the lid.

The upper portion 46 also defines the inlet 22 which, as previously mentioned, is tangential to initiate vortex flow about the vertical axis in the annular space 24.

The centre portion of the lid 42 includes an annular raised portion 68 to accommodate posts 70 for mounting the fan 36 and motor 38. Within the raised portion 68 is an annular portion 72 bordering the outlet 34 and defined centrally by an upturned lip 74. This lip locates a ring 76 accommodating parts of a blow-back system 78 as will be described. The ring is sealed to the lid at an O-ring 80 and to the fan by a similar O-ring 82. These O-rings are under load resulting from clamping the assembly together using the mounting posts 70.

Figure 2:
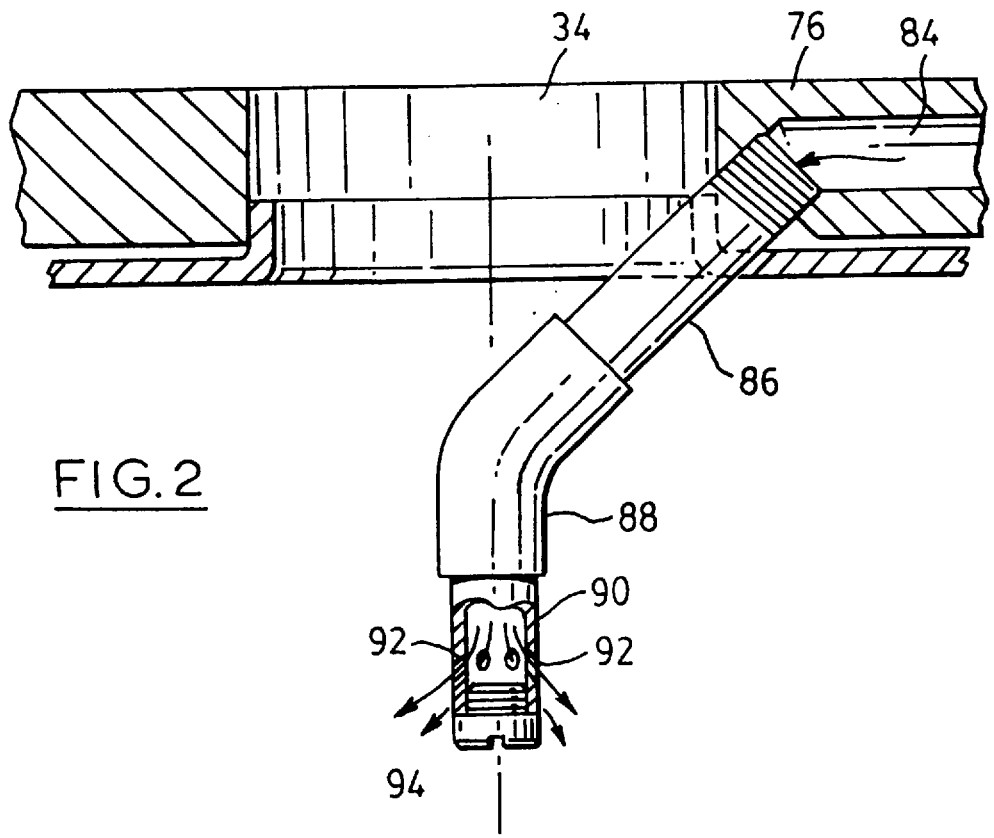
FIG. 2 is a side sectional view of a portion of the separator and showing details of a blowback nozzle drawn to a larger scale than that used in FIG. 1.

The blow-back system 78 consists of a series of pipe fittings receiving compressed air from a compressor unit 83 having a timed relay valve 85 for releasing pressure from an accumulator 87 as will be explained. The piping leads to the ring 76 which has a bore 84 shown in FIG. 2 leading to an angled pipe 86 and elbow 88. In turn, the elbow leads to a centrally positioned outlet 90 having a series of angled radial openings 92 and closed by an end plug 94. As a result, when compressed air at elevated pressure is allowed to pass through the blow-back system 78, a series of jets of air will impinge on the filter element 32 (FIG. 1) and blow back through the filter thereby releasing particles clinging to the outer surface. These particles will then be entrapped in air and some may fall out downwardly into the frustro-conical hopper 30 for collection through the batch release closure 55.

The air is pulsed through the blow-back system as required but conveniently, a timer 96 seen in FIG. 1 will provide pulses on a programmed basis to assist maintaining the filter in good condition.

The very fine particles found in powders such as those used in drug manufacture, etc. can be stripped from the air using the separator 20 down to a size of one micron. Clearly, a filter with one micron capability will plug very readily and it was found that in an inline situation, the filter plugged instantaneously. In the present structure it is possible to run the filter for significant lengths of time without maintenance. The addition of the blow-back structure 78 adds to the likelihood of maintaining the filter without clogging and it has been found that the system can be run for many hours without difficulty.

Figure 3:
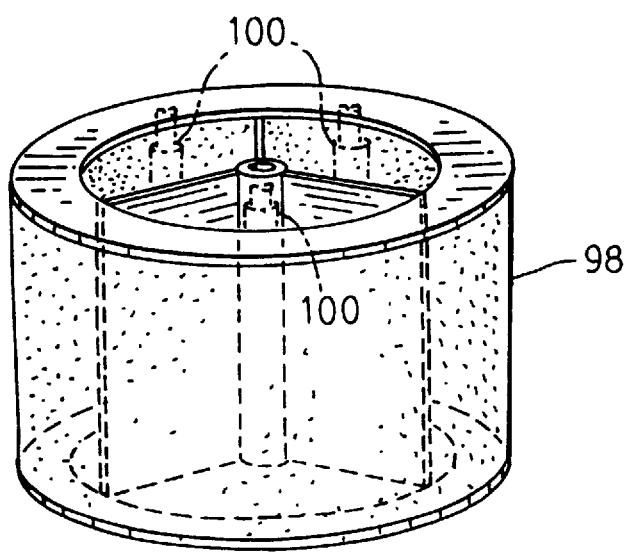
FIG. 3 is an isometric view of an alternative form of filter element.

In larger structures, it may be necessary to provide a more direct blow-back structure and it would be desirable that the filter continues to operate during blow-back. This can be achieved as shown in FIG. 3 by dividing a filter element 98 into sections, for instance 3 sections as shown. With simple modification to the structure shown in FIG. 1, it would be possible to provide three nozzles 100 and pulse them independently so that one third of the filter element is being back-flushed each time there is a pulse of air. This means that two thirds of the filter element is in use always.

Other modifications to the structure are within the scope of the invention as described and claimed.

I claim:

1. A separator for removing particulates from air comprising:

a housing having a tangential inlet for creating a vortex flow of air and having an outer shell and a cylindrical wall which defines a plurality of louvres and has a lower extremity within said housing;

a central axial outlet extending upwardly from said housing;

a cylindrical filter disposed radially inward of said cylindrical wall and such that air must pass through said filter to reach said outlet; and a conical hopper having an upper extremity which combines with said lower extremity of said cylindrical wall to provide an access from a first annular space, defined by said outer shell and said cylindrical wall in combination with said hopper, to a second annular space, defined by said cylindrical wall in combination with said hopper and said filter, wherein said cylindrical wall defining said plurality of louvres is spaced from said filter such that said vortex flow is maintained so that particulate build up on the filter will tend to be dislodged to maintain the filter active.

2. A separator as claimed in claim 1 further comprising a blow-back system coupled to the filter for providing pressurized air inside the filter to reverse the air flow through the filter to dislodge particulates from the filter and cause the dislodged particulates to enter the vortex flow to encourage these particulates to fall downwardly out of the second annular space.

3. A separator as claimed in claim 2 in which the filter has several compartments and the blow-back system includes a separate nozzle in each of the compartments.

* * * * *

UNITED STATES PATENT AND TRADEMARK OFFICE
CERTIFICATE OF CORRECTION

PATENT NO. : 5,845,782
DATED : December 8, 1998
INVENTOR(S) : Llewellyn E. Depew It is certified that error appears in the above-identified patent and that said Letters Patent is hereby corrected as shown below:

At column 2, line 29, delete "annula" and insert therefor --annular--.

At column 3, line 8, delete "40" and insert therefor --48--.

At column 4, lines 53-56, delete the paragraph break between "dislodged" and "particulates to enter the vortex . . . annular space."

Signed and Sealed this

Thirteenth Day of July, 1999

Attest:

Q. TODD DICKINSON

*Attesting Officer*   Acting Commissioner of Patents and Trademarks